US012560313B2

(12) United States Patent
Jiang et al.

(10) Patent No.: US 12,560,313 B2
(45) Date of Patent: Feb. 24, 2026

(54) PRESS LOCK AND STAGE LIGHT FIXTURE HAVING SAME

(71) Applicant: Guangzhou Haoyang Electronic Co., Ltd., Guangzhou (CN)

(72) Inventors: Weikai Jiang, Guangzhou (CN); Jun Luo, Guangzhou (CN); Zhiqiang Chen, Guangzhou (CN); Renping Ye, Guangzhou (CN); Xianhui Liu, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 19/006,850

(22) Filed: Dec. 31, 2024

(65) Prior Publication Data

US 2025/0290622 A1 Sep. 18, 2025

(30) Foreign Application Priority Data

Mar. 18, 2024 (CN) .......................... 202410311082.5

(51) Int. Cl.
| | |
|---|---|
| *F21V 21/26* | (2006.01) |
| *F16B 5/06* | (2006.01) |
| *F21V 21/30* | (2006.01) |
| *F21W 131/406* | (2006.01) |

(52) U.S. Cl.
CPC ............ *F21V 21/26* (2013.01); *F16B 5/0621* (2013.01); *F21V 21/30* (2013.01); *F21W 2131/406* (2013.01)

(58) Field of Classification Search
CPC ........ F21V 21/26; F21V 21/30; F16B 5/0621; F21W 2131/406
USPC ......................................................... 362/427
See application file for complete search history.

(56) References Cited

U.S. PATENT DOCUMENTS

| | | | | |
|---|---|---|---|---|
| 4,410,933 A * | 10/1983 | Blake | ..................... | F16M 11/10 362/427 |
| 5,473,523 A * | 12/1995 | Von Fange | .............. | F21V 19/02 362/240 |
| 10,557,493 B1 * | 2/2020 | Hibbs | ................... | F16B 5/0621 |
| 11,747,001 B2 * | 9/2023 | Mizobe | ................... | F21V 21/26 362/427 |
| 2019/0309930 A1 * | 10/2019 | Ernst | ....................... | F21V 17/06 |

* cited by examiner

*Primary Examiner* — Laura K Tso

(74) *Attorney, Agent, or Firm* — MUNCY, GEISSLER, OLDS & LOWE, P.C.

(57) ABSTRACT

A press lock includes a lock plate, and a locking member including a lower mounting plate, a pressing cap, and a lock lever. An elastic retention member configured to maintain the lock lever in a balanced position and a guide block with a guide groove are further included, where an end of a hook connected to the pressing cap is received in the guide groove. When the end of the hook is located at a lower locking position of the guide groove, the pressing cap acts on the elastic retention member to allow the lock lever to move downwards to fit with the lock plate, and when the end of the hook is located at an upper locking position of the guide groove, the lower mounting plate acts on the elastic retention member to allow the lock lever to move upwards and disengage from the lock plate.

15 Claims, 7 Drawing Sheets

PRESS LOCK AND STAGE LIGHT FIXTURE HAVING SAME

CROSS REFERENCE TO RELATED APPLICATIONS

The present application claims priority from Chinese Application No. CN 202410311082.5 filed on Mar. 18, 2024, all of which are hereby incorporated herein by reference.

TECHNICAL FIELD

The present disclosure relates to the technical field of stage light fixtures, in particular to a press lock and a stage light fixture having the same.

BACKGROUND

A stage light fixture generally includes a light head, a support arm for supporting rotation of the light head, and a base for supporting rotation of the support arm. During maintenance or transportation, it is usually required to lock the light head and the support arm to limit arbitrary rotation thereof. With regard to the existing lock structure including a lock lever and a lock plate, in order to operate the lock lever to enter or insert the lock hole or the notch of the lock plate to realize locking, the lock lever is required to be aligned with the lock hole or the notch in the lock plate. In the same way, in order to operate the lock lever to exit from the lock hole or the notch to realize unlocking, the lock lever is required to not abut against the lock plate. Therefore, to achieve locking or unlocking, it requires the user to continuously operate the lock lever with one hand, simultaneously continuously operate the light head and the support arm of the stage light fixture to rotate to a correct position with the other hand. Such lock structure thus is not convenient to operate, especially in the situation that the stage light fixture is needed to maintain at high altitude after installation.

SUMMARY

It is therefore an object of the present disclosure to provide an improved press lock which is free from the aforesaid drawbacks of the prior art. The press lock in the present disclosure can be operated regardless of whether the lock lever and the lock plate are aligned or interfered with each other, where when the lock lever is released, the lock plate moves to the correct position, then the lock lever automatically locks or unlocks the lock plate.

One aspect of the present disclosure provides a press lock, which includes a lock plate;

a locking member configured to lock the lock plate, comprising:

a lower mounting plate, which is located above the lock plate; and a pressing cap and a lock lever which are located above the lower mounting plate, the pressing cap being connected with a hook, wherein the lower mounting plate is provided with a lower penetration hole for the lock lever to pass therethrough;

an elastic retention member, which is configured to maintain the lock lever in a balanced position; and a guide block provided with a guide groove, the guide groove having an upper locking position and a lower locking position, wherein a free end of the hook is received in the guide groove, and the free end of the hook is configured to switch once between the upper locking position and the lower locking position at each time the pressing cap is pressed, wherein the lock lever is configured to move downwards and fit with or have a tendency of fitting with a locking portion on the lock plate, with the pressing cap acting on the elastic retention member, when the free end of the hook is located at the lower locking position; and wherein the lock lever is further configured to move upwards and disengage from the lock plate or have a tendency of disengaging from the lock plate, with the lower mounting plate acting on the elastic retention member, when the free end of the hook is located at the upper locking position.

The press lock in the present disclosure maintains the lock lever in a balanced position with an elastic retention member, and then locks the hook connected to the pressing cap with a guide block having a guide groove, and in response to the operation of the pressing cap, the free end of the hook will switch between the upper locking position and the lower locking position. In the present disclosure, the pressing cap is not directly connected to the lock lever but acts on the elastic retention member, therefore, even if the lock lever is interfered with by the lock plate and cannot change its position in time, the lock lever will automatically change its position after the interference on the lock lever by the lock plate is released, since the lock lever is always subjected to the action of the elastic retention member. Specifically, when the free end of the hook is located at the lower locking position, the pressing cap acts on the elastic retention member, such that the lock lever moves downwards to fit with or have a tendency of fitting with a locking portion on the lock plate, and when the free end of the hook is located at the upper locking position, the lower mounting plate acts on the elastic retention member, such that the lock lever moves upwards and is disengaged from the lock plate or has a tendency of disengaging from the lock plate.

Therefore, according to the present disclosure, it is not required to simultaneously operate the lock lever and the lock plate or an assembly connected thereto, which is convenient to use. The lock lever may be operated at any time and then the lock plate or an assembly connected thereto is operated, and once the lock lever moves (or moves slightly) to the correct position, the lock lever acts automatically.

In particular, the elastic retention member may include an upper elastic member and a lower elastic member according to a preferable embodiment of the present disclosure, where two ends of the upper elastic member act on the pressing cap and the lock lever, respectively, to exert a downward force on the lock lever, and two ends of the lower elastic member act on the lower mounting plate and the lock lever, respectively, to exert an upward force on the lock lever. With configuration of the elastic retention member including the upper elastic member and the lower elastic member, it is easy to assemble, meanwhile facilitating separate production according to the difference in performance requirements of the upper elastic member and the lower elastic member.

Furthermore, for the purpose of facilitating connection and engagement between the upper elastic member, the lower elastic member and the lock lever, and being simple to assemble, a side wall of the lock lever is preferably provided with a bump, where two ends of the upper elastic member abut against an upper side of the bump and the pressing cap, and two ends of the lower elastic member abut against a lower side of the bump and the lower mounting plate.

It is preferred to design the pressing cap not to protrude too much, since excessive protruding is not aesthetic. Accordingly, in the present disclosure the elasticity coefficient of the upper elastic member is preferably greater than that of the lower elastic member. In this way, when the pressing cap is pressed, the deformation amount of the lower elastic member will be greater than that of the upper elastic member, and since the pressing cap is not directly connected to the lock lever, the displacement amount of the lock lever is the deformation amount of the lower elastic member and the displacement amount of the pressing cap is the sum of the deformation amount of the upper elastic member and the deformation amount of the lower elastic member. Therefore, with the elasticity coefficient of the upper elastic member greater than that of the lower elastic member, the displacement amount of the pressing cap can be reduced in the case where the displacement amount of the lock lever is the same, thereby avoiding excessive protruding of the pressing cap.

More preferably, as tower-shaped structure is stable and has a large deformation space, the upper elastic member and/or the lower elastic member are all designed in form of tower springs, with a narrower end thereof acting on the lock lever.

In order to reduce the height of the pressing cap protruding from the upper mounting plate and exhibit an aesthetic perception, the pressing cap in the present disclosure is preferably provided with an avoidance hole corresponding to the lock lever.

In an advantageous embodiment, to allow the pressing cap to move more smoothly and thus less likely to be jammed, an upper mounting plate may be further included, which is provided with an upper penetration hole to guide the pressing cap.

Further, an outer side of the pressing cap is preferably provided with a retaining rim to prevent the pressing cap from falling out of the upper penetration hole.

In addition, to design the press lock in a separate component, which thus can be integrally mounted on other elements, in the present disclosure two ends of the lower mounting plate are connected to the upper mounting plate, and the middle portion of the lower mounting plate is formed with an accommodating space for accommodating the pressing cap, the lock lever, the elastic retention member, the hook and the guide block.

In an advantageous embodiment, the locking portion is in form of a lock hole or a notch. With such configuration, relative movement of the lock plate, e.g., rotation or movement can be limited with the lock lever entering or inserting into the lock hole or the notch.

In a bid to make the force on the pressing cap more balanced to avoid skewing, it is preferred to provide two guide blocks fitted with two hooks. For the purpose of this, two guide blocks are provided and arranged oppositely, and two hooks are correspondingly provided, with each of the two hooks fitted with one of the guide blocks.

In an advantageous embodiment, the guide groove includes a first groove and a second groove which are respectively located on two sides of a connecting line between the upper locking position and the lower locking position, where the first groove unidirectionally guides the end of the hook from the upper locking position to the lower locking position, and the second groove unidirectionally guides the end of the hook from the lower locking position to the upper locking position. In this way, when the end of the hook moves in the first groove or the second groove, the end of the hook will return to the lower locking position or the upper locking position under an effect of the elasticity of the hook itself. Moreover, with the first groove and the second groove which limit unidirectional movement of the end of the hook, the end of the hook can be unidirectionally guided from the upper locking position to the lower locking position, and can be unidirectionally guided from the lower locking position to the upper locking position, respectively. Therefore, in such simple structure which is not easy to be damaged, it can achieve that each time the pressing cap is pressed, the end of the hook will switch once between the upper locking position and the lower locking position.

Furthermore, the depth of the first groove at the upper locking position is greater than the depth of the second groove at the upper locking position, such that when the end of the hook passes through the second groove and reaches the upper locking position, the end of the hook automatically enters the first groove, which contributes to guidance of the first groove to the end of the hook when the pressing cap is pressed next time. The depth of the first groove at the lower locking position is less than the depth of the second groove at the lower locking position, and the end of the hook always abuts against the bottom of the first groove or the bottom of the second groove, such that when the end of the hook passes through the first groove and reaches the lower locking position, the end of the hook automatically enters the second groove, which contributes to guidance of the second groove to the end of the hook when the pressing cap is pressed next time.

Additionally, according to the present disclosure, the first groove includes a first groove section and a second groove section which are communicated with each other, the ends, away from each other, of the first groove section and the second groove section being respectively connected to the upper locking position and the lower locking position, and the second groove includes a third groove section and a fourth groove section which are communicated with each other, the ends, away from each other, of the third groove section and the fourth groove section being respectively connected to the upper locking position and the lower locking position, where compared with the lower locking position, the connecting position between the first groove section and the second groove section and the connecting position between the third groove section and the fourth groove section are closer to the lower mounting plate. With such configuration, the end of the hook can be limited to maintain at the lower locking position without leaving the position under the effect of the elastic retention member.

Moreover, according to a preferably embodiment, in order to allow the end of the hook to transition smoothly at the connection position of the first groove and the second groove, at the connecting position between the first groove section and the second groove section, the groove depth of the second groove section is deeper, at the connecting position between the third groove section and the fourth groove section, the groove depth of the third groove section is deeper, and the end of the hook always abuts against the bottom of the first groove section, the bottom of the second groove section, the bottom of the third groove section, or the bottom of the fourth groove section.

Another aspect of the present disclosure provides a stage light fixture having the press lock at any case mentioned above, which includes a light head configured to project lighting, a support arm configured to support rotation of the light head, and a base configured to support rotation of the support arm. The press lock is configured to lock the light head or the support arm to respectively restrict rotation of the light head relative to the support arm and rotation of the support arm relative to the base.

Reference signs: 100 lock plate, 110 locking portion, 20 locking member, 200 lock lever, 210 bump, 300 lower mounting plate; 310 lower penetration hole, 320 accommodating space, 400 pressing cap, 410 avoidance hole, 420 retaining rim, 500 elastic retention member, 510 upper elastic member, 520 lower elastic member, 600 guide block, 610 guide groove, 611 first groove, 6111 first groove section, 6112 second groove section, 612 second groove, 6121 third groove section, 6122 fourth groove section, 620 upper locking position, 630 lower locking position, 700 hook, 800 upper mounting plate, 810 upper penetration hole, 820 guide cylinder, 910 light head, 920 support arm, 930 base.

DETAILED DESCRIPTION

The accompanying drawings are merely for exemplary illustration and are not to be construed as a limitation of the present disclosure. In order to better illustrate the present embodiment, some components in the accompanying drawings may be omitted, enlarged or reduced, which does not represent the size of the actual product. For those skilled in the art, it is understandable that certain publicly known structures and their descriptions in the accompanying drawings may be omitted. The positional relationships described in the accompanying drawings are merely for exemplary illustration and are not to be construed as a limitation of the present disclosure.

Figure 1:
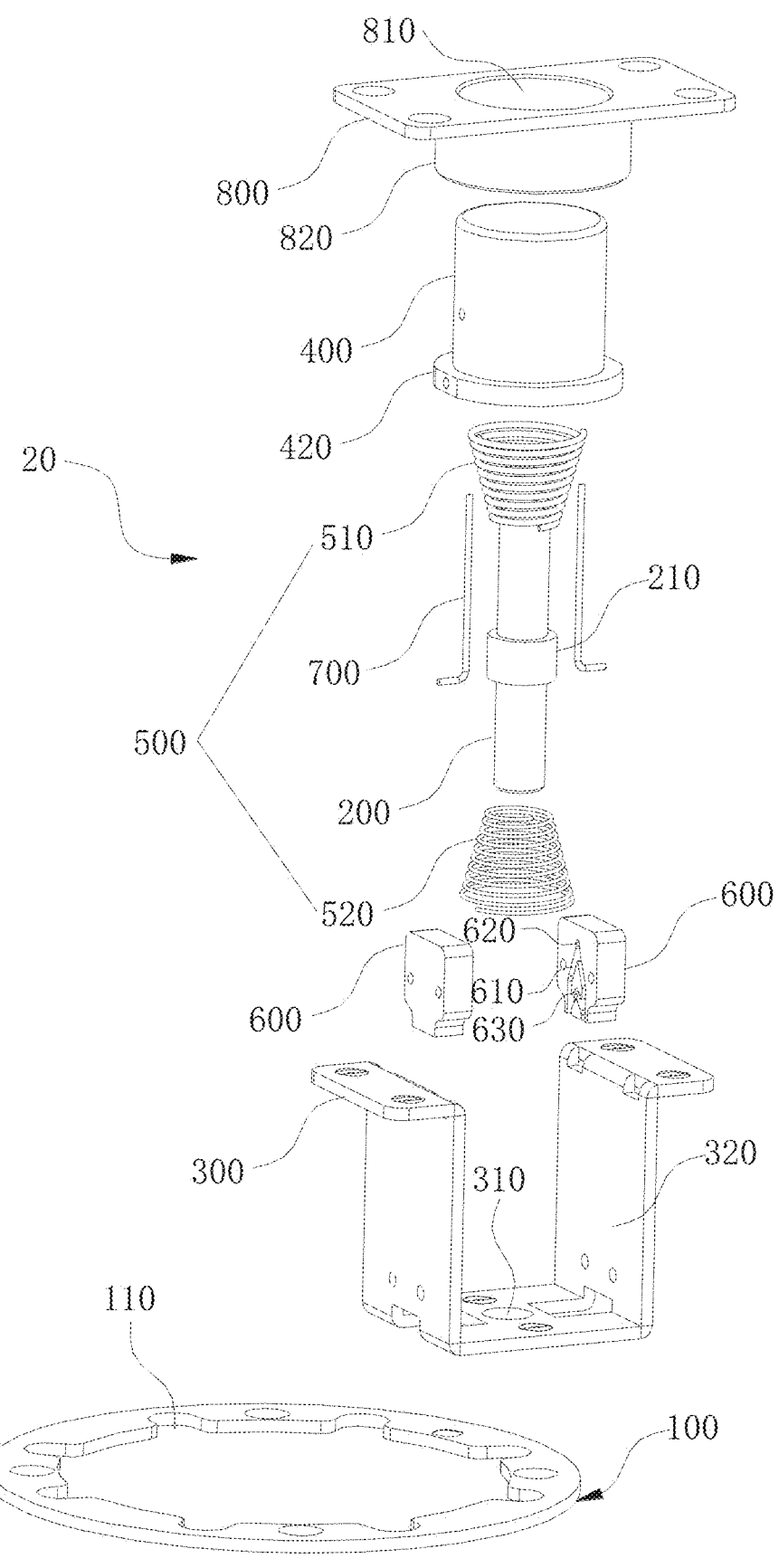
FIG. 1 is an exploded structural view of a press lock according to an embodiment of the present disclosure.
Figure 2:
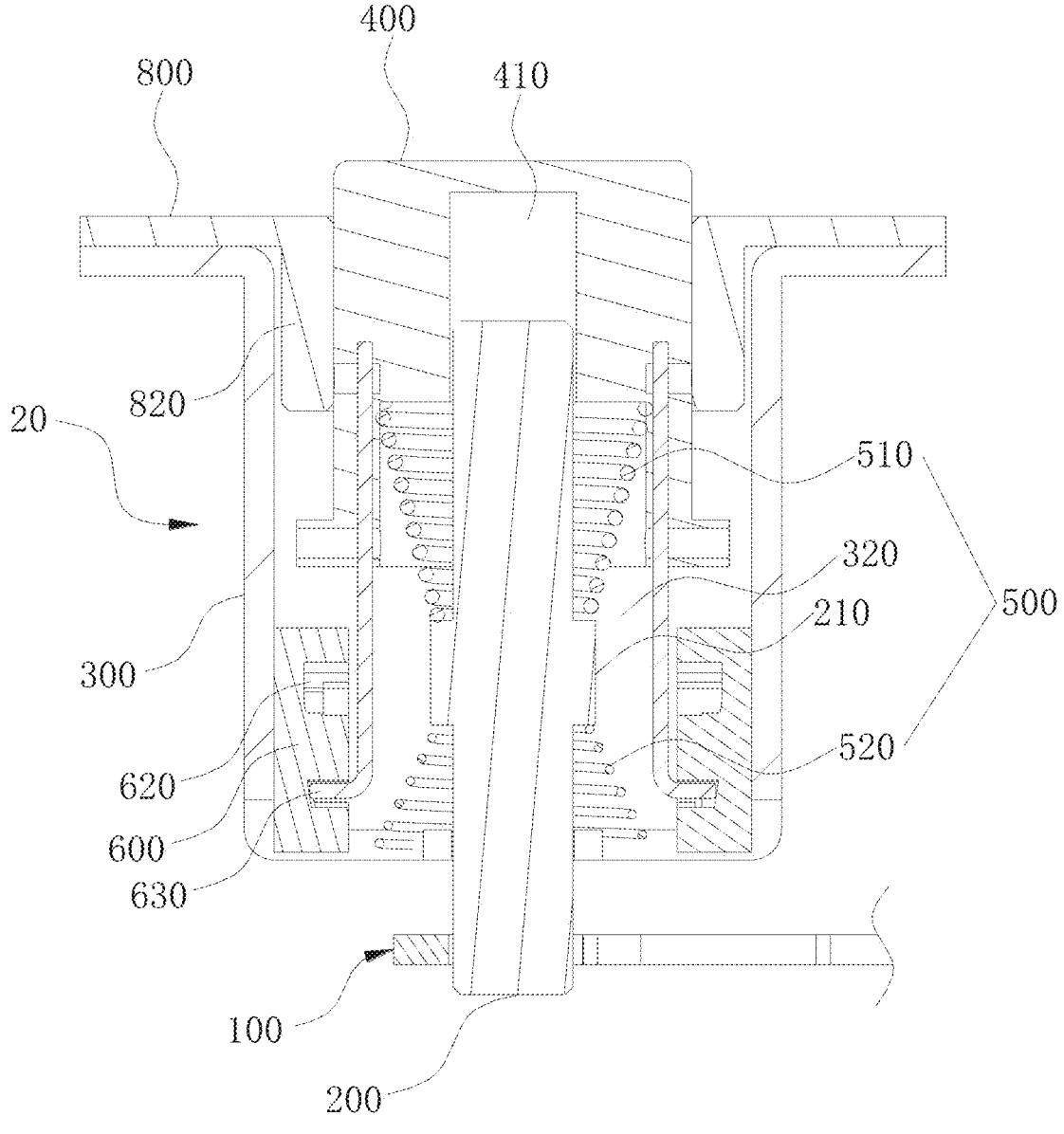
FIG. 2 is a structural schematic diagram showing that a lock lever is pressed to lock a lock plate, in which the lock lever is aligned with a locking portion on the lock plate, according to an embodiment of the present disclosure.
Figure 3:
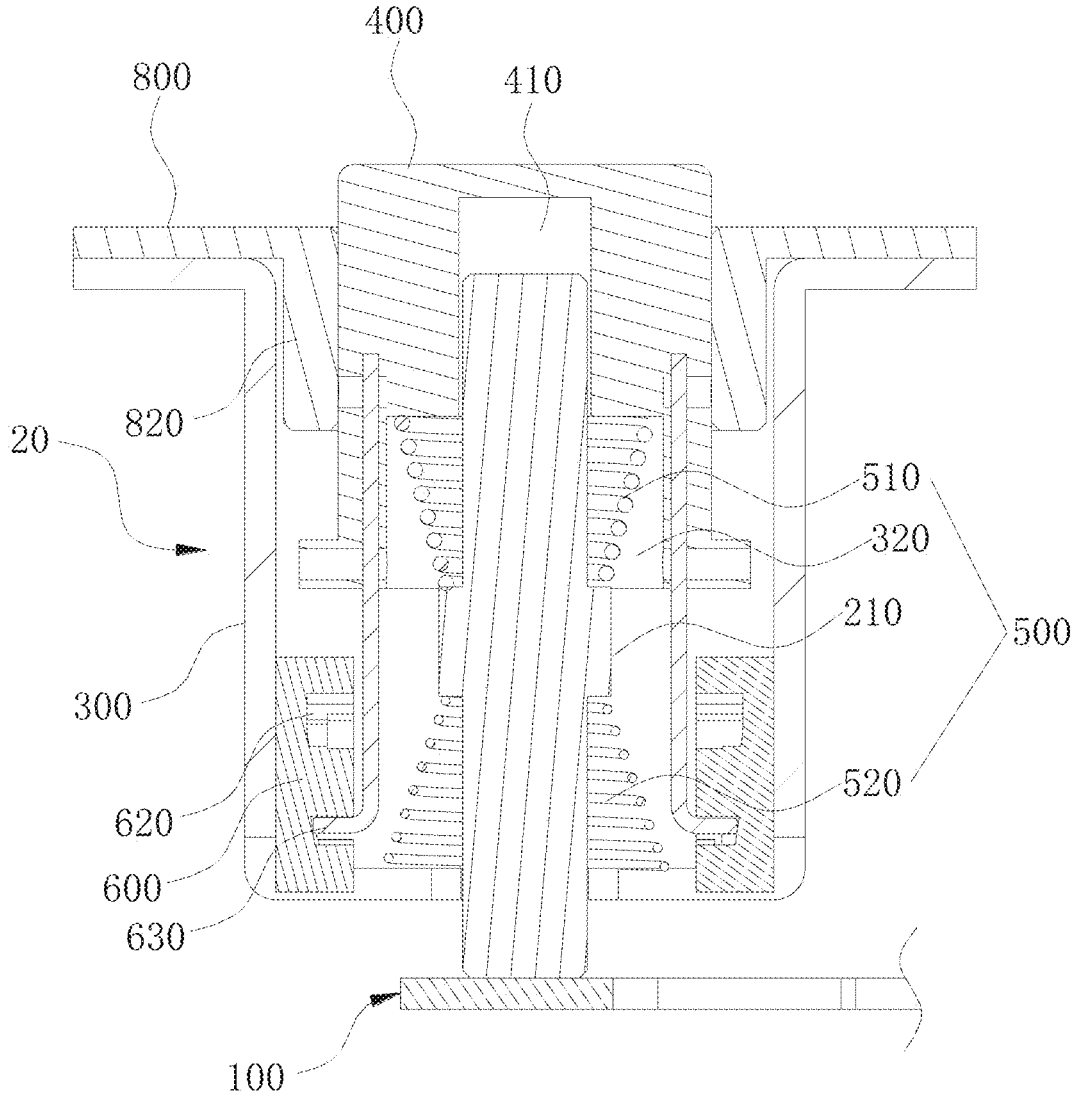
FIG. 3 is a structural schematic diagram showing that the lock lever is pressed to lock the lock plate, in which the lock lever is not aligned with the locking portion on the lock plate according to an embodiment of the present disclosure.
Figure 4:
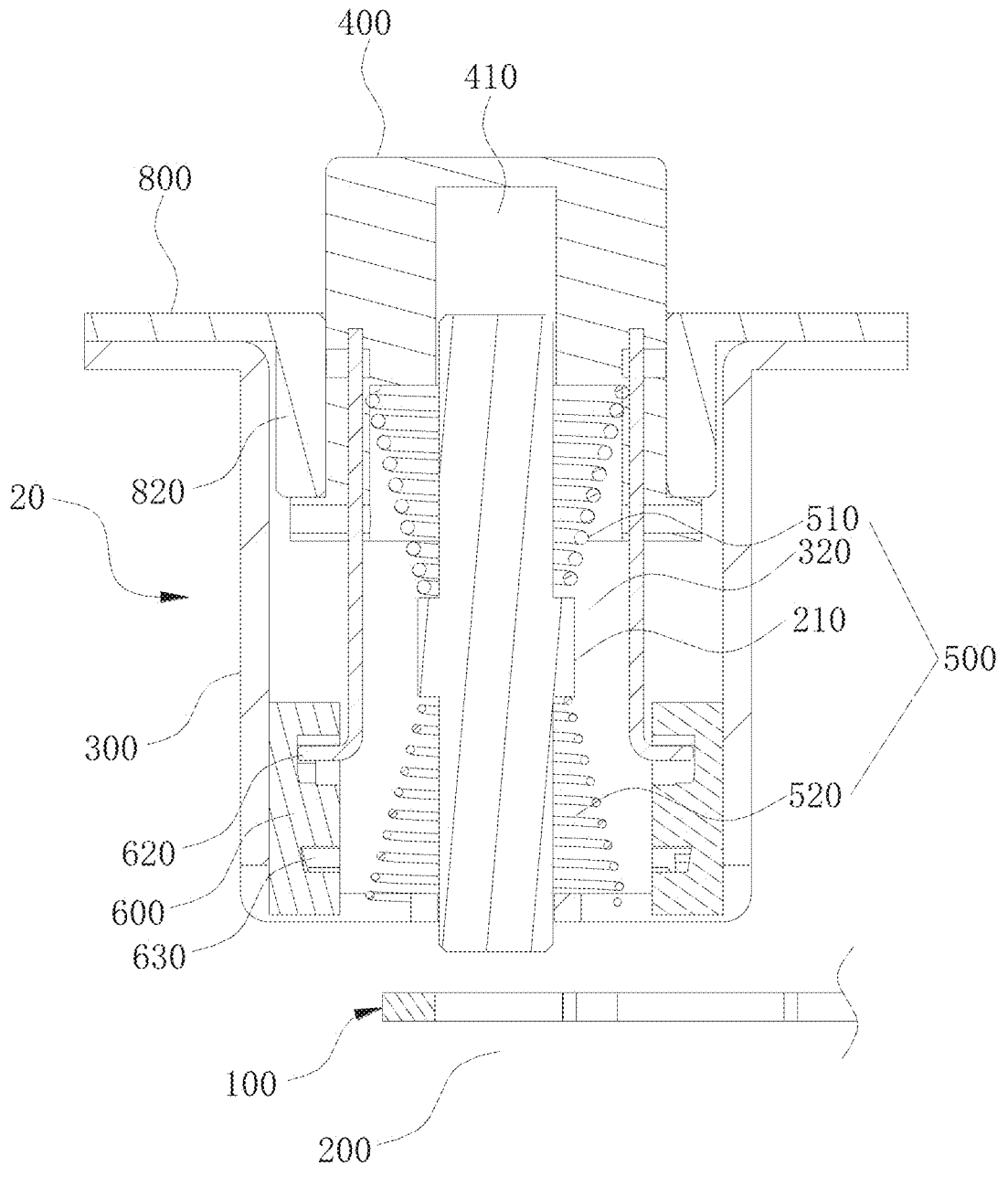
FIG. 4 is a structural schematic diagram showing that the lock lever is pressed to unlock the lock plate, in which the lock plate is not interfered with the lock lever, according to an embodiment of the present disclosure.
Figure 5:
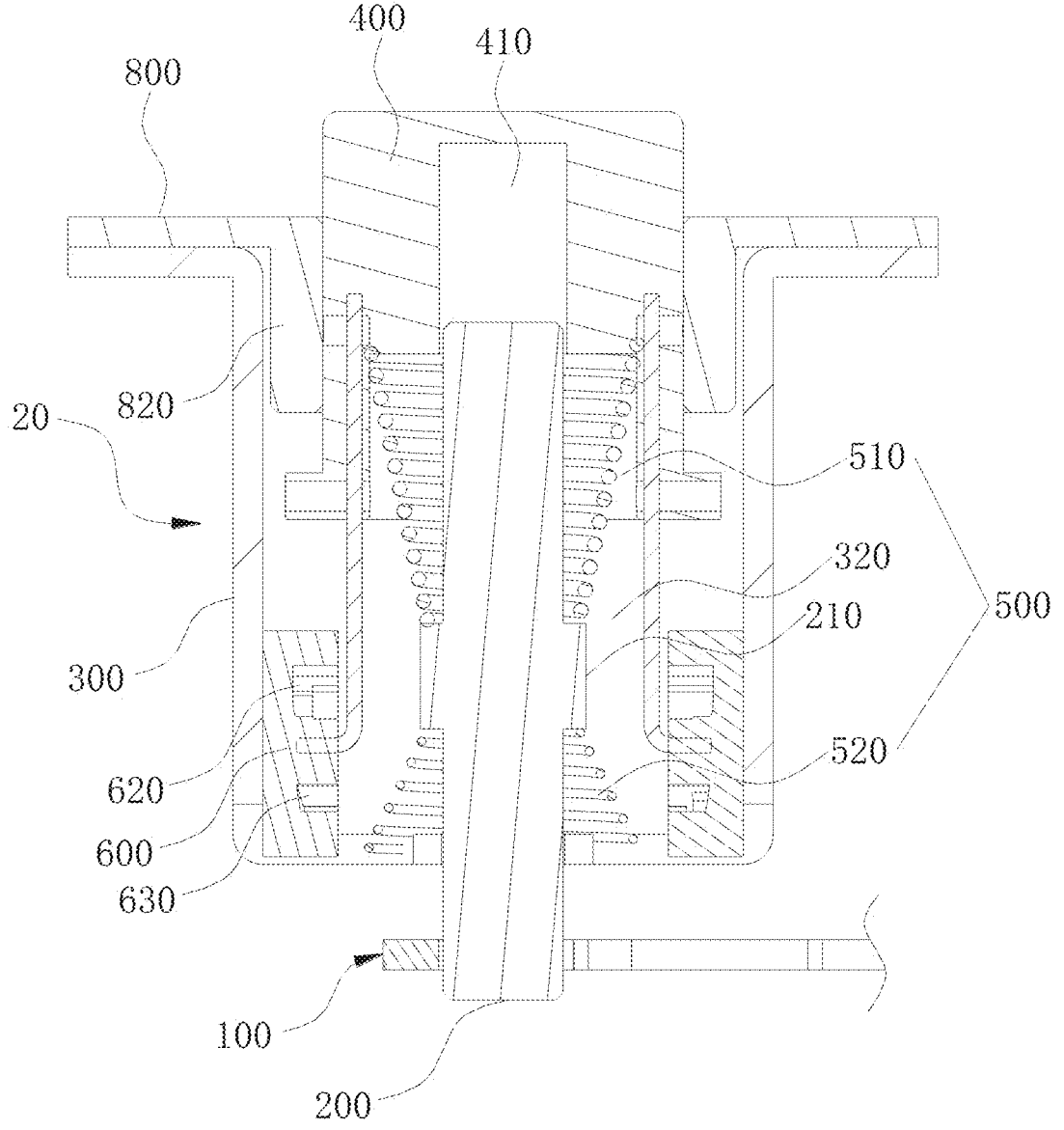
FIG. 5 is a structural schematic diagram showing that the lock lever is pressed to unlock the lock plate, in which the lock plate is interfered with the lock lever, according to an embodiment of the present disclosure.

FIGS. 1 to 5 provide a press lock according to at least one embodiment of the present disclosure, wherein FIG. 1 shows an explosive view of a press lock according to an embodiment of the present disclosure; FIG. 2 shows a view that a lock lever is pressed to lock a lock plate when the lock lever is aligned with a locking portion on the lock plate; FIG. 3 shows a view that the lock lever is pressed to lock the lock plate when the lock lever is not aligned with the locking portion on the lock plate; FIG. 4 shows a view that the lock lever is pressed to unlock the lock plate when the lock plate is not interfered with the lock lever; and FIG. 5 shows a view that the lock lever is pressed to unlock the lock plate when the lock plate is interfered with the lock lever according to an embodiment of the present disclosure.

Referring to FIG. 1, the press lock in the present embodiment includes a lock plate 100 and a locking member 20 configured to lock the lock plate 100. The locking member 20 particularly includes a lower mounting plate 300, and a pressing cap 400 and a lock lever 200 which are located above the lower mounting plate 300. The lock plate 100 is located below the lower mounting plate 300. A lower penetration hole 310 for the lock lever 200 to pass through is formed in the lower mounting plate 300. The press lock further includes an elastic retention member 500 configured to maintain the lock lever 200 in a balanced position. A guide block 600 with a guide groove 610 is further provided. The guide groove 610 has an upper locking position 620 and a lower locking position 630. The pressing cap 400 is connected with a hook 700, with an end of the hook 700 extending into the guide groove 610, which is configured in a way that the pressing cap 400 is pressed one time, such end of the hook 700 is switched once between the upper locking position 620 and the lower locking position 630. When the end of the hook 700 is located at the lower locking position 630, the pressing cap 400 acts on the elastic retention member 500, such that the lock lever 200 moves downwards to fit with or have a tendency of fitting with a locking portion 110 on the lock plate 100, and when the end of the hook 700 is located at the upper locking position 620, the lower mounting plate 300 acts on the elastic retention member 500, such that the lock lever 200 moves upwards and is disengaged from the lock plate 100 or has a tendency of disengaging from the lock plate 100.

According to the present disclosure, the press lock maintains the lock lever 200 in a balanced position with the elastic retention member 500 provided, and then locks the position of the hook 700 connected to the pressing cap 400 by a guide block 600 with a guide groove 610, so that each time the pressing cap 400 is pressed, the end of the hook 700 will switch once between the upper locking position 620 and the lower locking position 630. In this embodiment, the pressing cap 400 is not directly connected to the lock lever 200 but acts on the elastic retention member 500. With such configuration, even if the lock lever 200 is interfered with by the lock plate 100 and cannot change its position in time, the lock lever 200 will automatically changes its position after the interference on the lock lever 200 by the lock plate 100 is released, as the lock lever 200 is always subjected to the action of the elastic retention member 500.

For example, when the end of the hook 700 is located at the lower locking position 630, the pressing cap 400 acts on the elastic retention member 500, such that the lock lever 200 moves downwards to fit with the locking portion 110 on the lock plate 100 (as shown in FIG. 2, at this time, the lock lever 200 is aligned with the locking portion 110, the lock lever 200 thus can move downwards smoothly under the effect of the elastic retention member 500) or have a tendency of fitting with the locking portion 110 (as shown in FIG. 3, at this time, the lock lever 200 is not aligned with the locking portion 110, the lock lever 200 thus cannot move downwards smoothly under the effect of the elastic retention member 500).

In addition, when the end of the hook 700 is located at the upper locking position 620, the lower mounting plate 300 acts on the elastic retention member 500, such that the lock lever 200 moves upwards and is disengaged from the lock plate 100 (as shown in FIG. 4, at this time, the lock plate 100 does not interfere with the lock lever 200, the lock lever 200 thus can move upwards under the effect of the elastic retention member 500) or has a tendency of disengaging from the lock plate 100 (as shown in FIG. 5, the lock plate 100 interferes with the lock lever 200, the lock lever 200 thus cannot move upwards under the effect of the elastic retention member 500).

Therefore, according to the present embodiment, there is no need to simultaneously operate the lock lever 200 and the lock plate 100 or an assembly connected thereto, so that it is convenient for use. That is, the lock lever 200 may be operated at any time, then the lock plate 100 or the assembly connected thereto is operated, and once the lock plate 100 moves (or moves slightly) to the correct position, the lock lever 200 acts automatically. As FIG. 3 shown, even if at this time the lock lever 200 is not aligned with the locking portion 110, the lock lever 200 cannot move downwards smoothly under the effect of the elastic retention member 500, while when the lock plate 100 continues to move until the lock lever 200 is aligned with the locking portion 110, the lock lever 200 will move under the effect of the elastic retention member 500 to automatically achieve locking. Likewise, as FIG. 5 shown, even if at this time the lock plate 100 interferes with the lock lever 200, the lock lever 200 cannot move downwards under the effect of the elastic retention member 500, while when the lock plate 100 continues to move until the lock plate 100 does not interfere with the lock lever 200, the lock lever 200 will move upwards under the effect of the elastic retention member 500 to automatically achieve unlocking.

In the present embodiment, the hook 700 is in L-shaped form, a longitudinal end thereof is fastened to the pressing cap 400 via bolts or any other fasteners, and a transverse end thereof is received, preferably hung, in the guide groove 610 of the guide block 600.

The elastic retention member 500 particularly includes an upper elastic member 510 and a lower elastic member 520. Two ends of the upper elastic member 510 respectively act on the pressing cap 400 and the lock lever 200 to exert a downward force on the lock lever 200, and two ends of the lower elastic member 520 respectively act on the lower mounting plate 300 and the lock lever 200 to exert an upward force on the lock lever 200. Designing the elastic retention member 500 into the upper elastic member 510 and the lower elastic member 520 facilitates assembling as well as facilitates separate production according to the difference in performance requirements of the upper elastic member 510 and the lower elastic member 520.

According to the present embodiment, when the end of the hook 700 is located at the upper locking position 620, the pressing cap 400 is pressed to compress the upper elastic member 510, the upper elastic member 510 pushes the lock lever 200 to move and at the same time compresses the lower elastic member 520, the displacement amount of the pressing cap 400 is the sum of the deformation amount of the upper elastic member 510 and the deformation amount of the lower elastic member 520, and the displacement amount of the lock lever 200 is the deformation amount of the lower elastic member 520. Since the pressing cap 400 is not directly connected to the lock lever 200 but acts on the upper elastic member 510, the end of the hook 700 may move to the lower locking position 630 and be fixed therein regardless of whether the lock lever 200 is aligned with the locking portion 110 on the lock plate 100. If the lock lever 200 is aligned with the locking portion 110 on the lock plate 100, the lock lever 200 enters the locking portion 110 directly to lock the lock plate 100, and if the lock lever 200 is not aligned with the locking portion 110 on the lock plate 100, the lock lever 200 abuts against the lock plate 100, and the upper elastic member 510 continuously exerts a downward elastic force on the lock lever 200, such that the lock lever 200 has a tendency of moving downwards, until the lock plate 100 moves to the position where the lock lever 200 is aligned with the locking portion 110, the lock lever 200 automatically extends out under the effect of the upper elastic member 510 to lock the lock plate 100.

When the end of the hook 700 is located at the lower locking position 630 and the pressing cap 400 is pressed, the end of the hook 700 is disengaged from the lower locking position 630. If the lock plate 100 does not interfere with the lock lever 200, the pressing cap 400 will move upwards under the combined effect of the upper elastic member 510 and the lower elastic member 520, until the end of the hook 700 moves to the upper locking position 620, while the lock lever 200 will move to a balanced position under the effect of the lower elastic member 520, thereby unlocking the lock plate 100. If the lock plate 100 interferes with the lock lever 200 so that the lock lever 200 cannot move, the pressing cap 400 will move upwards under the separate effect of the upper elastic member 510, until the end of the hook 700 moves to the upper locking position 620, while the lower elastic member 520 will continuously exert an upward force on the lock lever 200, such that the lock lever 200 has a tendency of moving downwards. Along with movement of the lock plate 100, the interference on the lock lever 200 disappears, at this time the lock lever 200 may move upwards to the balanced position under the separate effect of the lower elastic member 520, thereby unlocking the lock plate 100.

The action between the upper elastic member 510 and the pressing cap 400 and the lock lever 200 as well as the action between the lower elastic member 520 and the lower mounting plate 300 and the lock lever 200 may be produced by connection or by abutting.

In other embodiments, the upper elastic member 510 may also provide an upward pulling force to the lock lever 200, and the lower elastic member 520 provides a downward pulling force to the lock lever 200. At this case, the action between the upper elastic member 510 and the pressing cap 400 and the lock lever 200 as well as the action between the lower elastic member 520 and the lower mounting plate 300 and the lock lever 200 is produced by connection.

As shown in FIGS. 2 to 5, a side wall of the lock lever 200 is provided with a bump 210, two ends of the upper elastic member 510 respectively abut against an upper side of the bump 210 and the pressing cap 400, and two ends of the lower elastic member 520 respectively abut against a lower side of the bump 210 and the lower mounting plate 300. The bump 210 is designed to facilitate connection and fitting between the upper elastic member 510, the lower elastic member 520 and the lock lever 200, achieving simple assembly.

The bump 210 is particularly in annular shape (shown in FIG. 1), which is circumferentially arranged around the lock lever 200 and is located substantially in a middle position of the lock lever 200.

In a more preferred embodiment of the present disclosure, an elastic coefficient of the upper elastic member 510 is greater than that of the lower elastic member 520. In this way, when the pressing cap 400 is pressed, the deformation amount of the lower elastic member 520 will be greater than that of the upper elastic member 510. Since the pressing cap 400 is not directly connected to the lock lever 200, the displacement amount of the lock lever 200 is the deformation amount of the lower elastic member 520, and the displacement amount of the pressing cap 400 is the sum of the deformation amount of the upper elastic member 510 and the deformation amount of the lower elastic member 520. Therefore, with the elasticity coefficient of the upper elastic member 510 greater than that of the lower elastic member 520, the displacement amount of the pressing cap 400 may be reduced in the case where the displacement amount of the lock lever 200 is the same, which can avoid excessive protruding of the pressing cap 400, since excessive protruding is not aesthetic.

In the present embodiment, the elasticity coefficient of the upper elastic member 510 is twice that of the lower elastic member 520.

The upper elastic member 510 and/or the lower elastic member 520 are preferably tower springs with one end narrower than the other end, the narrower end acts on the lock lever 200. The tower-shaped structure is stable and has a large deformation space.

Further, the pressing cap 400 is preferably provided with an avoidance hole 410 corresponding to the lock lever 200. The avoidance hole 410 is designed to reduce the height of the pressing cap 400 protruding from the upper mounting plate 800 and exhibit an aesthetic perception.

In the present embodiment, the avoidance hole 410 simultaneously guides the lock lever 200.

The press lock further includes an upper mounting plate 800, which is provided with an upper penetration hole 810 to guide the pressing cap 400. Therefore, the pressing cap 400 can move more smoothly and is less likely to be jammed and not moving.

In the present embodiment, the upper mounting plate 800 is provided with a guide cylinder 820 for guiding the pressing cap 400 around the upper penetration hole, and the guide cylinder 820 is located on a side, close to the lower mounting plate 300, of the upper mounting plate 800.

In the present embodiment, the lower penetration hole 310 simultaneously guides the lock lever 200.

An outer side of the pressing cap 400 is preferably provided with a retaining rim 420 to prevent the pressing cap 400 from falling out of the upper penetration hole 810.

In the present embodiment, when the lock lever 200 is in a balanced position, the elastic retention member 500 abuts against the pressing cap 400, such that the retaining rim 420 abuts against the upper mounting plate 800, thereby ensuring wobbling at will of the pressing cap 400, and obtaining a more compact and solid structure.

In particular, two ends of the lower mounting plate 300 are connected to the upper mounting plate 800, and the middle part of the lower mounting plate 300 is bent to form an accommodating space 320 for accommodating the pressing cap 400, the lock lever 200, the elastic retention member 500, the hook 700 and the guide block 600. In this way, it is possible for the press lock to be a separate component and thus to be integrally mounted on other elements.

The locking portion 110 is preferably in form of a lock hole or a notch. With such configuration, relative movement of the lock plate 100, e.g., rotation or movement can be limited with the lock lever 200 entering or inserting into the lock hole or the notch.

In the present embodiment, the lock plate 100 moves rotationally and the locking portions 110 are circumferentially distributed around the lock plate 100.

Preferably, two guide blocks 600 are provided and arranged oppositely. Accordingly, two hooks 700 are provided, with each of the two hooks 700 respectively fitted with one of the guide blocks 600. With two guide blocks 600 fitted with two hooks 700, the force on the pressing cap 400 is balanced to avoid skewing.

In the present embodiment, the guide block 600 is fixed to the lower mounting plate 300 and is arranged between the lower mounting plate 300 and the upper mounting plate 800.

Figure 6:
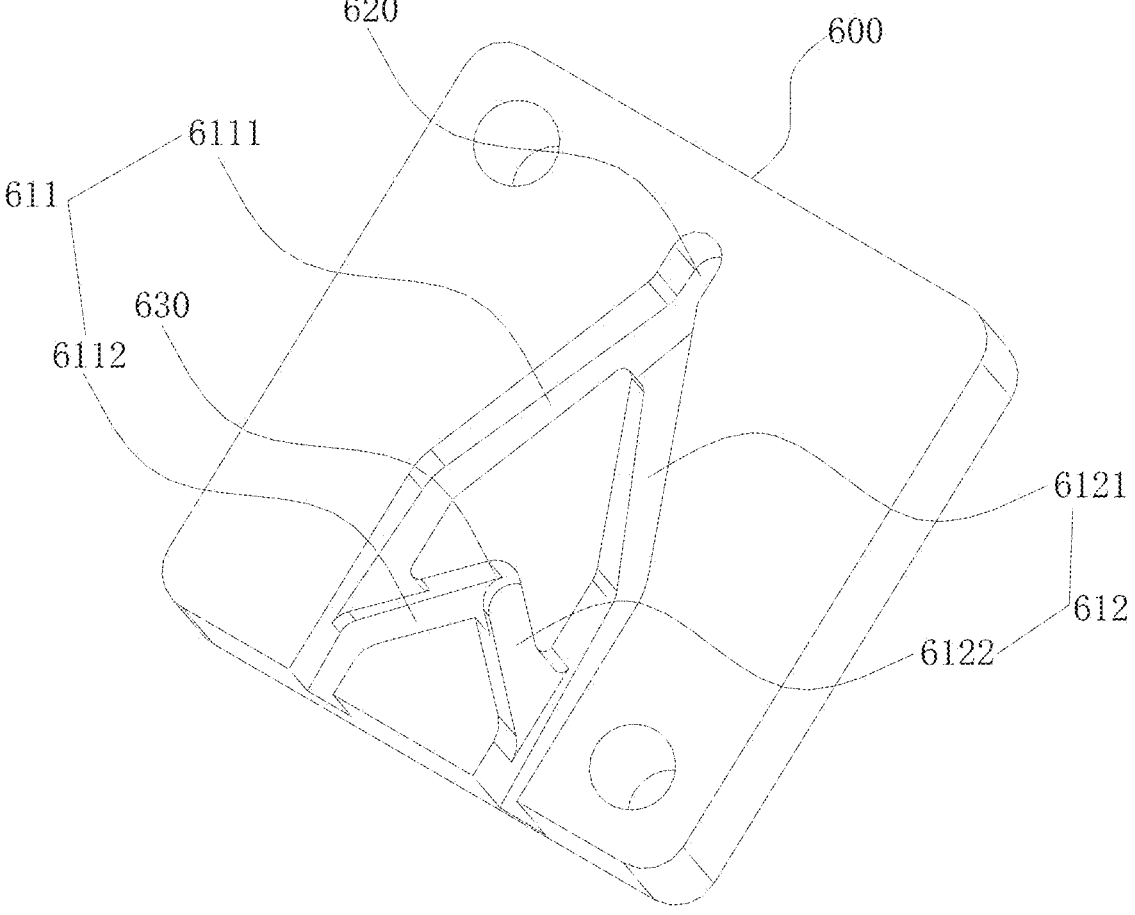
FIG. 6 is a structural view of a guide block of the press lock according to an embodiment of present disclosure.

Further referring to FIG. 6, the guide groove 610 preferably includes a first groove 611 and a second groove 612 which are respectively located on two sides of a connecting line between the upper locking position 620 and the lower locking position 630, where the first groove 611 unidirectionally guides the end of the hook 700 from the upper locking position 620 to the lower locking position 630, and the second groove 612 unidirectionally guides the end of the hook 700 from the lower locking position 630 to the upper locking position 620. In this way, when the end of the hook 700 moves in the first groove 611 or the second groove 612, since the end, fitted with the guide block 600, of the hook 700 is deflected relative to the end, fitted with the pressing cap 400, of the hook 700, the end of the hook 700 fitted with the guide block 600 will return to the lower locking position 630 or the upper locking position 620 under the effect of the elasticity of the hook 700 itself. Moreover, with the first groove 611 and the second groove 612 which limit unidirectional movement of the end of the hook 700, the end of the hook 700 can be unidirectionally guided from the upper locking position 620 to the lower locking position 630, and unidirectionally guided from the lower locking position 630 to the upper locking position 620, respectively. Therefore, each time the pressing cap 400 is pressed, the end of the hook 700 will switch once between the upper locking position 620 and the lower locking position 630. Such structure is simple and not easily damaged.

More preferably, the depth of the first groove 611 at the upper locking position 620 is greater than the depth of the second groove 612 at the upper locking position 620, such that when the end of the hook 700 passes through the second groove 612 and reaches the upper locking position 620, the end of the hook 700 automatically enters the first groove 611, which facilitates the first groove 611 guiding the end of the hook 700 when the pressing cap 400 is pressed next time. In addition, the depth of the first groove 611 at the lower locking position 630 is less than the depth of the second groove 612 at the lower locking position 630, and the end of the hook 700 always abuts against the bottom of the first groove 611 or the bottom of the second groove 612, such that when the end of the hook 700 passes through the first groove 611 and reaches the lower locking position 630, the end of the hook 700 automatically enters the second groove 612, which facilitates the second groove 612 guiding the end of the hook 700 when the pressing cap 400 is pressed next time.

Particularly, the first groove 611 includes a first groove section 6111 and a second groove section 6112 which are communicated with each other, the ends, away from each other, of the first groove section 6111 and the second groove section 6112 being respectively communicated with the upper locking position 620 and the lower locking position 630. Correspondingly, the second groove 612 includes a third groove section 6121 and a fourth groove section 6122 which are communicated with each other, the ends, away from each other, of the third groove section 6121 and the fourth groove section 6122 being respectively connected to the upper locking position 620 and the lower locking position 630. In addition, compared with the lower locking position 630, the connecting position between the first groove section 6111 and the second groove section 6112 and the connecting position between the third groove section 6121 and the fourth groove section 6122 are closer to the lower mounting plate 300, so as to limit the end of the hook 700 and keep the end of the hook 700 at the lower locking position 630 without leaving the position under the effect of the elastic retention member 500. Furthermore, at the connecting position between the first groove section 6111 and the second groove section 6112, the groove of the second groove section 6112 is deeper, at the connecting position between the third groove section 6121 and the fourth groove section 6122, the groove of the third groove section 6121 is deeper, and the end of the hook 700 always abuts against the bottom of the first groove section 6111, the bottom of the second groove section 6112, the bottom of the third groove section 6121 or the bottom of the fourth groove section 6122. With such configuration, the end of the hook 700 may transition smoothly at the connecting position of the first groove 611 and the second groove 612.

In the present embodiment, the first groove section 6111, the second groove section 6112, the third groove section 6121 and the fourth groove section 6122 are all straight grooves.

Figure 7:
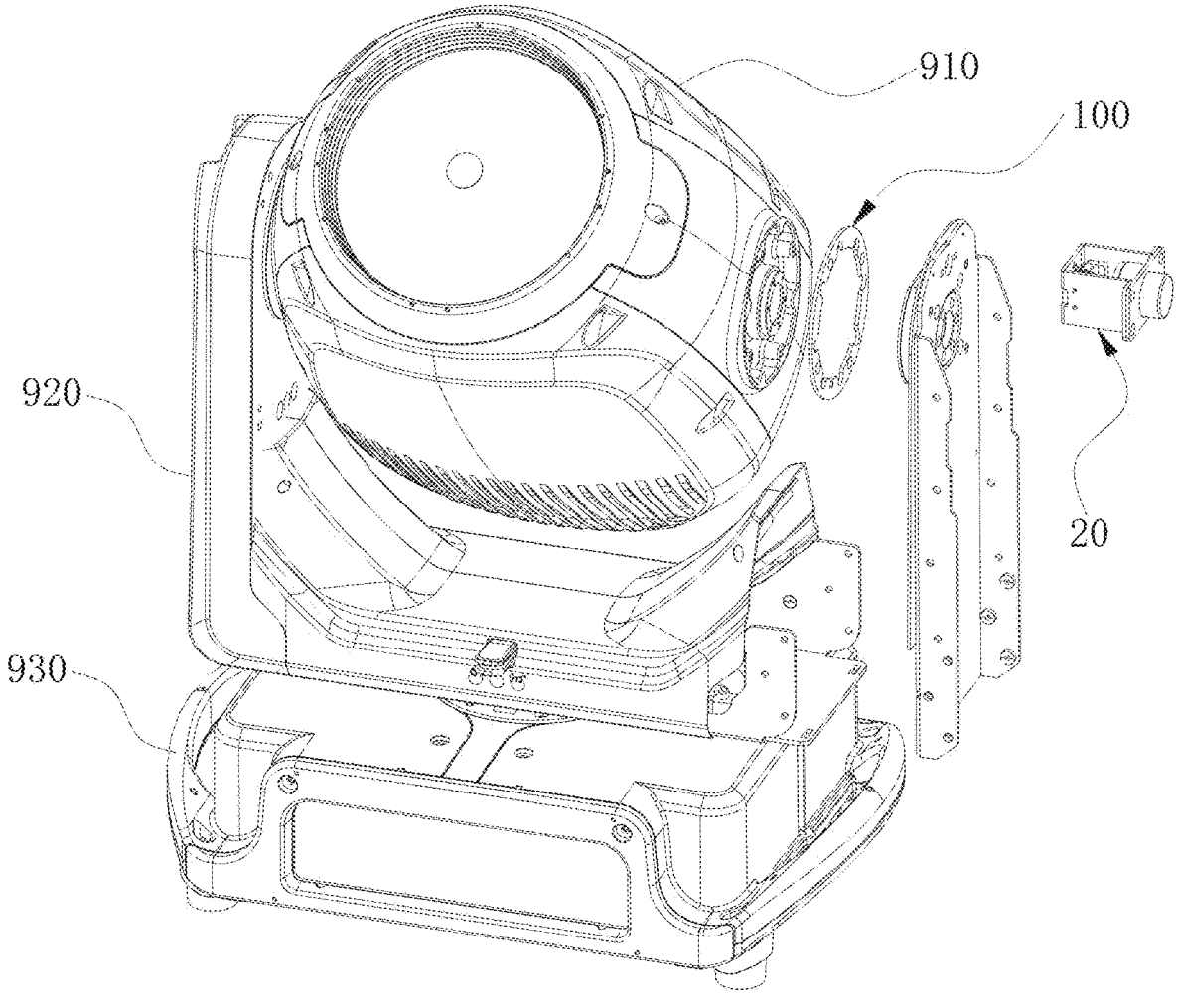
FIG. 7 is a structural view of a stage light fixture provided with the press lock according to an embodiment of the present disclosure.

FIG. 7 shows a stage light fixture including the press lock at any case mentioned above, which further includes a light head 910 configured to project light beams, a support arm 920 configured to support rotation of the light head 910, and a base 930 configured to support rotation of the support arm 920. The press lock in this embodiment is configured to lock the light head 910 or the support arm 920, to respectively restrict rotation of the light head 910 relative to the support arm 920, and rotation of the support arm 920 relative to the base 930.

In the present embodiment, the press lock is configured to lock the light head 910, with the locking member 20 of the press lock arranged on the support arm 920 and the lock plate 100 of the press lock rotatable along with the light head 910. In other embodiments, the press lock can be configured to lock the support arm 920, with the locking member 20 of the press lock arranged on the support arm 920 and rotatable along with the support arm 920, and the lock plate 100 of the press lock fixed to the base 930. However, it is conceivable that the mounting positions of the locking member 20 and the lock plate 100 may also be exchanged as required.

Obviously, the above embodiments of the present disclosure are merely examples for the purpose of clearly illustrating the present disclosure, and are not intended to be a limitation of the embodiments of the present disclosure. For those skilled in the art, other variations or changes in different forms may be made on the basis of the above description. It is neither necessary nor possible to exhaust all the embodiments herein. Any modifications, equivalent substitutions and improvements made within the spirit and principles of the present disclosure shall all fall within the protection scope of the claims of the present disclosure.

What is claimed is:

1. A press lock, comprising:
a lock plate;
a locking member configured to lock the lock plate, comprising:
a lower mounting plate, which is located above the lock plate;
a pressing cap and a lock lever which are located above the lower mounting plate, the pressing cap being connected with a hook, wherein the lower mounting plate is formed with a lower penetration hole for the lock lever to pass therethrough;
an elastic retention member, which is configured to maintain the lock lever in a balanced position; and
a guide block provided with a guide groove, the guide groove having an upper locking position and a lower locking position, wherein a free end of the hook is received in the guide groove, and wherein the free end of the hook is configurated to switch once between the upper locking position and the lower locking position at each time the pressing cap is pressed, wherein the lock lever is configured to move toward the lock plate to fit with a locking portion on the lock plate, with the pressing cap acting on the elastic retention member, when the free end of the hook is located at the lower locking position; and wherein the lock lever is further configured to move away from the lock plate to disengage from the lock plate, with the lower mounting plate acting on the elastic retention member, when the free end of the hook is located at the upper locking position.

2. The press lock according to claim 1, wherein the elastic retention member comprises an upper elastic member and a lower elastic member, two ends of the upper elastic member are configured to act on the pressing cap and the lock lever, respectively, to exert a downward force on the lock lever, and two ends of the lower elastic member are configured to act on the lower mounting plate and the lock lever, respectively, to exert an upward force on the lock lever.

3. The press lock according to claim 2, wherein a side wall of the lock lever is provided with a bump, wherein two ends of the upper elastic member are respectively abutted against an upper side of the bump and the pressing cap, and two ends of the lower elastic member are respectively abutted against a lower side of the bump and the lower mounting plate.

4. The press lock according to claim 2, wherein an elasticity coefficient of the upper elastic member is greater than that of the lower elastic member.

5. The press lock according to claim 2, wherein the upper elastic member and/or the lower elastic member are in form of tower springs with a narrower end thereof acting on the lock lever.

6. The press lock according to claim 1, wherein the pressing cap is provided with an avoidance hole corresponding to the lock lever.

7. The press lock according to claim 1, further comprising an upper mounting plate, which is provided with an upper penetration hole to guide the pressing cap.

8. The press lock according to claim 7, wherein an outer side of the pressing cap is provided with a retaining rim to prevent the pressing cap from falling out of the upper penetration hole.

9. The press lock according to claim 7, wherein two ends of the lower mounting plate are connected to the upper mounting plate, and the middle portion of the lower mounting plate is formed with an accommodating space for accommodating the pressing cap, the lock lever, the elastic retention member, the hook and the guide block.

10. The press lock according to claim 1, wherein the locking portion is in form of a lock hole or a notch.

11. The press lock according to claim 1, wherein two guide blocks are provided and arranged oppositely, and two hooks are correspondingly provided, with each of the two hooks fitting with one of the guide blocks.

12. The press lock according to claim 1, wherein the guide groove comprises a first groove and a second groove which are respectively located on two sides of a connecting line between the upper locking position and the lower locking position, wherein the first groove is configured to unidirectionally guide the end of the hook from the upper locking position to the lower locking position, and the second groove is configured to unidirectionally guide the end of the hook from the lower locking position to the upper locking position.

13. The press lock according to claim 12, wherein a depth of the first groove at the upper locking position is greater than a depth of the second groove at the upper locking position, a depth of the first groove at the lower locking position is less than a depth of the second groove at the lower locking position, and the free end of the hook is configured to be always abutted against a bottom of the first groove or a bottom of the second groove.

14. The press lock according to claim 12, wherein the first groove comprises a first groove section and a second groove section which are communicated with each other, with the ends, away from each other, of the first groove section and the second groove section being respectively connected to the upper locking position and the lower locking position, and the second groove comprises a third groove section and a fourth groove section which are communicated with each other, with the ends, away from each other, of the third groove section and the fourth groove section being respectively connected to the upper locking position and the lower locking position, wherein compared with the lower locking position, a connecting position between the first groove section and the second groove section and a connecting position between the third groove section and the fourth groove section are closer to the lower mounting plate; and wherein at the connecting position between the first groove section and the second groove section, a groove depth of the second groove section is deeper, at the connecting position between the third groove section and the fourth groove section, a groove depth of the third groove section is deeper, and the free end of the hook is always abutted against a bottom of the first groove section, a bottom of the second groove section, a bottom of the third groove section or a bottom of the fourth groove section.

15. A stage light fixture, comprising the press lock according to claim 1, and further comprising a light head configured to project light beams, a support arm configured to support rotation of the light head, and a base configured to support rotation of the support arm, wherein the press lock is configured to lock the light head or the support arm.

* * * * *